May 12, 1970 AN WANG 3,511,974

AUTOMATICALLY CONTROLLED CALCULATING APPARATUS

Filed March 22, 1966 2 Sheets-Sheet 1

AUTOMATICALLY CONTROLLED CALCULATING APPARATUS

Filed March 22, 1966

United States Patent Office 3,511,974 Patented May 12, 1970

3,511,974

AUTOMATICALLY CONTROLLED CALCULATING APPARATUS

An Wang, Lincoln, Mass., assignor to Wang Laboratories Inc., Tewksbury, Mass., a corporation of Massachusetts Continuation-in-part of application Ser. No. 398,254, Sept. 22, 1964. This application Mar. 22, 1966, Ser. No. 536,428
Int. Cl. G06f *15/02;* G06k *7/01*
U.S. Cl. 235—61.6 10 Claims

ABSTRACT OF THE DISCLOSURE

An electronic calculator system includes a record sensing device for receiving a record in fixed relation to said device. Numerical values from 0 through 9 and instruction codes for controlling calculator operation are applied respectively to the calculator input display register and arithmetic unit from either the record sensing device or a manually operable keyboard unit.

This application is a continuation-in-part of my copending application Ser. No. 398,254, filed Sept. 22, 1964, entitled "Calculating Apparatus," now Pat. No. 3,402,285.

This invention relates to calculating apparatus of the type which do not employ large data storage capabilities.

Current commercial and scientific procedures demand that increasingly large masses of data be processed, and such processing frequently involves or is an integral part of mathematical analyses. Such mathematical analyses encompass in addition to addition, subtraction, multiplication, and division even more complex manipulations, e.g. those employing exponential values. While digital computers of conventional logic organization can perform such manipulations the techniques that are employed frequently involve complex, circuitous and time-consuming operations to obtain the desired results or solutions to specific problems.

The calculator, the principal component of which is an arithmetic unit, provides a basic logic arrangement for performing mathematical manipulations. It is an object of this invention to provide novel and improved arrangements for controlling a calculator. Another object of the invention is to provide novel and improved arrangements enabling logarithmic manipulations to be performed in a calculator logic organization.

The logarithm is a well known tool for simplifying mathematical operations. However, the techniques for utilizing logarithms in calculations have, in general, employed either mechanical devices (analog computers) in the nature of slide rules or similar but more sophisticated devices or stored tables of logarithmic values (e.g. a preset relay matrix) in a digital computer type of device. The analog devices in addition to the speed and accuracy limitations inherent in such devices have characteristics of inflexibility relative to available processing techniques, while the stored table technique requires tremendous storage capacity which results in large and expensive computer equipment.

Accordingly, it is an object of this invention, to provide a novel, improved and compact calculating apparatus which enables more expeditious performance of mathematical manipulations.

Still another object of the invention is to provide a novel and improved calculator logic organization capable of performing computations on a logarithmic basis.

A further object of the invention is to provide novel and improved apparatus for generating logarithms.

A further object of the invention is to provide novel and improved apparatus for generating antilogarithms.

A further object of this invention is to provide a novel and compact calculator which can be programmed to perform complex and extended mathematical operations.

A further object of this invention is to provide a novel and compact calculator programmable through a compact and inexpensive reader capable of sequentially reading an information bearing record.

A further object of this invention is to provide a novel and compact reader capable of sequentially reading an information bearing record.

A further object of this invention is to provide a novel and compact calculator logic organization capable of performing iterative operations automatically.

The invention features a calculator having a first register for receiving input data and means capable of performing addition and subtraction on the data in the first register, a second register and means for accumulating in the second register the sums or differences of constants, and storage means for storing a small number of logarithmic values of known numbers for delivery to said second register. Information is entered in the first register in response to manually actuated keys or in response to a record sensing device. A control unit controls the operation of the first and second registers to enable mathematical operations not involving simple addition and subtraction to be carried out logarithmically using the logarithmic values in the storage means.

In the preferred embodiment the invention features a record sensor which sequentially senses data encoded on the record. The record sensor receives and holds the record in fixed relation to itself through the data sensing operation. The sensor has a matrix of data item sensors disposed in locations corresponding to the data item positions on the record. These data item sensors are arranged in groups and an actuator (an input line) is coupled to each group. The sensors in the groups that correspond to one another are connected to a common output line. A program counter, containing the address of the group of sensors to be energized, directs the sensing of the record. The resulting signals on the output line are applied to the control unit to cause the performance of the same manipulation as caused by a corresponding one of the manual keys. That counter is stepped to the next sensor group address by the control unit at the end of each manipulation performed by the calculator and causes the actuation of a group of sensors.

Other objects, features, and advantages will appear from the following description of a particular embodiment of the invention, taken together with the attached drawings thereof, in which.

Figure 1:
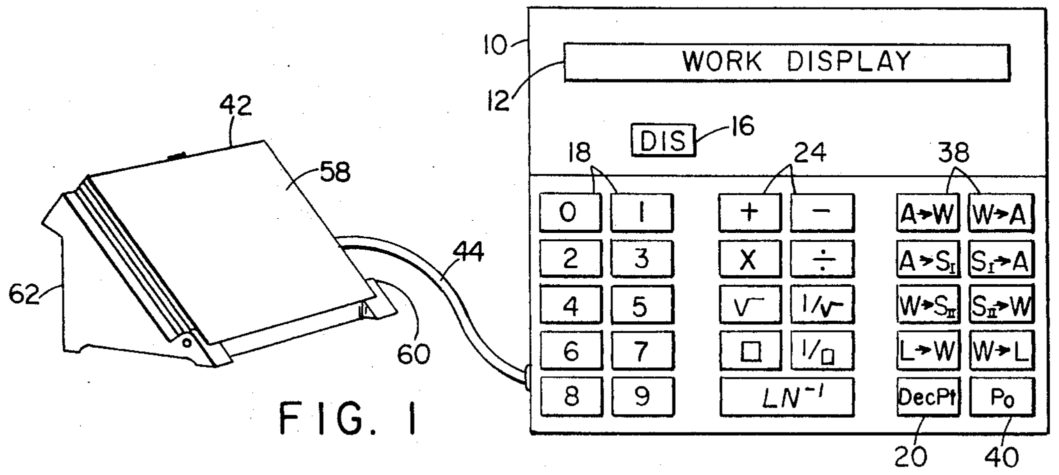
FIG. 1 is a view of a calculator system including a card reader constructed in accordance with the invention.
Figure 6:
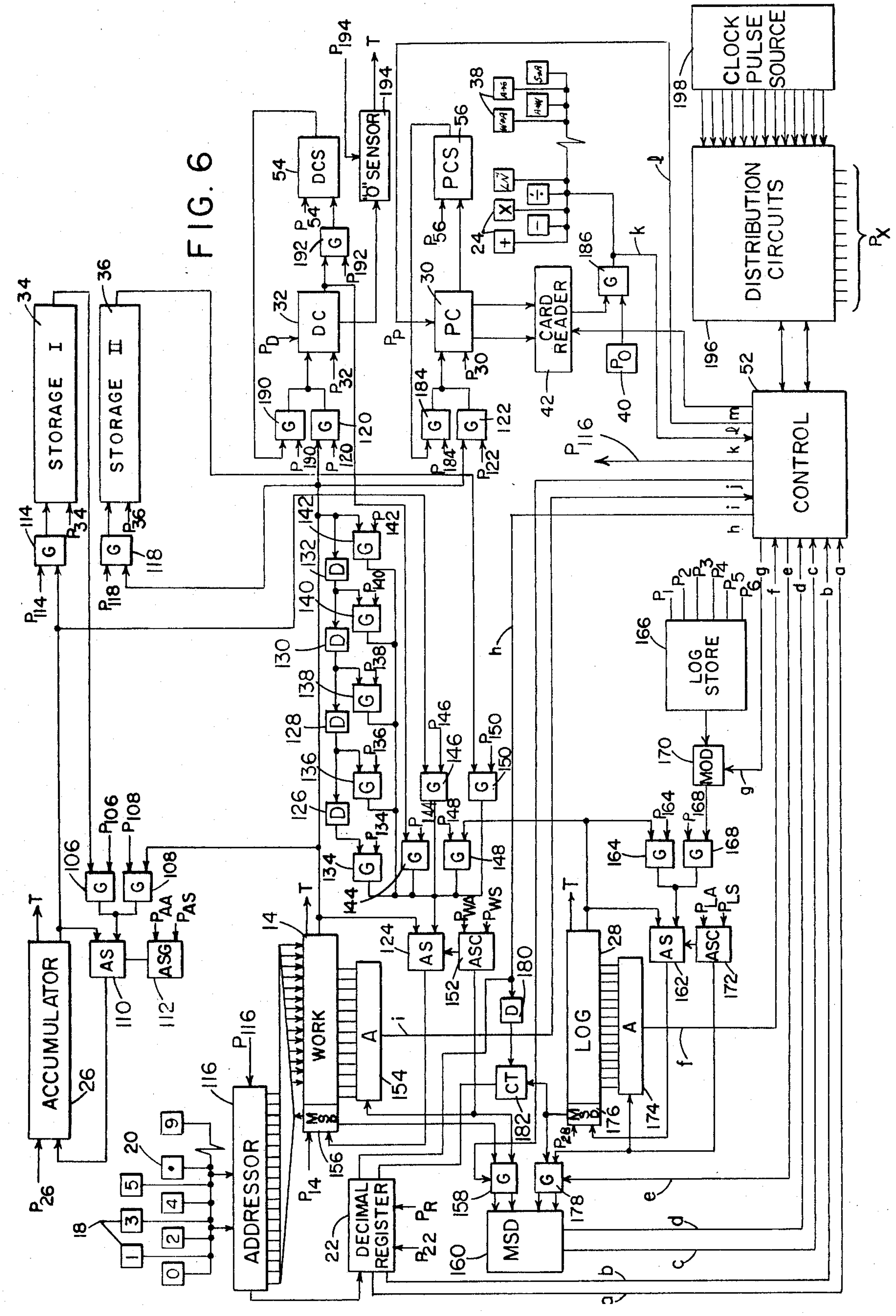
FIG. 6 is a block diagram of the calculator system shown in FIG. 1.

There is shown in FIG. 1 a diagrammatic view of the Calculator 10 and Display 12 for visually presenting the contents of Work Register 14, FIG. 6, upon command of Display Key 16. Numeral Keys 18 and Decimal Point Key 20, when operated, place their information in Work Register 14 and Decimal Register 22, respectively. Operations desired to be performed by Calculator 10 may be selected by the use of Instruction Keys 24. Data contained in Work Register 14, Accumulator Register 26, Log Register 28, Program Counter 30, Decrement Counter 32 and Storage Registers 34 and 36, FIG. 6, may be removed to another register by use of Transfer Keys 38.

The following tables correlate the functions of the various keys with their characters:

TABLE I.—TRANSFER KEYS

| Character | Function |
|---|---|
| A→W | Transfer contents of Accumulator Register 26 to Work Register 14. |
| W→A | Transfer contents of Work Register 14 to Accumulator Register 26. |
| A→$S_1$ | Transfer contents of Accumulator Register 26 to Storage I 34. |
| $S_1$→A | Transfer contents of Storage I 34 to Accumulator Register 26. |
| W→$S_2$ | Transfer contents of Work Register 14 to Storage II 36. |
| A→W | |
| W→A | |
| $S_2$→W | Transfer contents of Storage II 36 to Work Register 14. |
| W→L | Transfer contents of Work Register 14 to Log Register 28. |
| L→W | Transfer contents of Log Register 28 to Work Register 14. |

TABLE II—INSTRUCTION KEYS

| Character | Function |
|---|---|
| + | Add. |
| − | Subtract. |
| × | Multiply. |
| ÷ | Divide. |
| √ | Calculate square root. |
| 1/√ | Calculate reciprocal of square root. |
| □ | Calculate square. |
| 1/□ | Calculate reciprocal of the square. |
| $LN^{-1}$ | Generate antilogarithm. |

There is not a separate key for generating the logarithm; depression of the Multiplication Key (X) after placing a number in Work Register 14 causes the logarithm of the number to be accumulated in Log Register 28. $P_0$ Key 40, when operated, removes control of the Calculator 10 from Keys 18, 20, 24, and 38 and places it in Card Reader 42, attached to the Calculator 10 by Cable 44.

Figure 5:
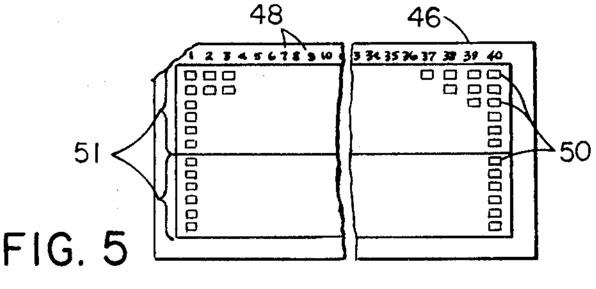
FIG. 5 is a view of a card usable with this system.

Card 46 (shown in FIG. 5) has a matrix of pre-scored positions arranged in forty columns 48 and twelve rows 50. Each position may be punched to form an aperture using only a pencil. Each column 48 is composed of two groups 51 of 6 data positions each. Card 46 is capable of introducing to Calculator 10, through Card Reader 42, all instructions, transfers, and values provided by Keys 18, 20, 24, and 38 as well as additional functions. The 6 bit binary code provided by a reading of an address on a punched card 46 is decoded within Card Reader 42 to present the same form of signals to Control 52 as is received from Keys 18, 20, 24 and 38.

In the following chart certain of the commands which may be programmed on Card 46 are listed and explained. The number to the left of each command is its representation in octal code. To obtain the corresponding code for punching on a program card, the octal digits are weighted in sequence 40, 20, 10, 4, 2 and 1. For example, the code for *W→PC* is 27, and is punched as follows:

40 20 10 4 2 1

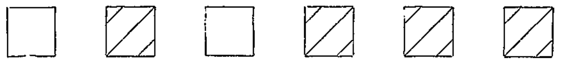

TABLE III.—PROGRAM CODE

| Code | Command | Remarks |
|---|---|---|
| (00) | Not assigned | |
| (01) | Prime | Clear all registers. |
| (02) | √ | Calculate square root. |
| (03) | 1/√ | Calculate reciprocal of square root. |
| (04) | □ | Calculate square. |
| (05) | 1/□ | Calculate reciprocal of square. |
| (06) | × | Multiply. |
| (07) | + | Add. |
| (10) | $LN^{-1}$ | Generate antilogarithm. |
| (11) | − | Subtract. |
| (12) | . | Decimal point. |
| (13) | ÷ | Divide. |
| (14) | 0 | Cardinal Numbers. |
| (15) | 1 | |
| (16) | 2 | |
| (17) | 3 | |
| (20) | 4 | |
| (21) | 5 | |
| (22) | 6 | |
| (23) | 7 | |
| (24) | 8 | |
| (25) | 9 | |
| (26) | Stop | Cease operation. |
| (27) | W→PC | Transfer contents of first two stages of Work Register 14 to Program Counter 30. |
| (30) | W→DC | Transfer contents of first two stages of Work Register 14 to Decrement Counter 32. |
| (31) | DC→W | Transfer contents of Decrement Counter 32 to first two stages of Work Register 14. |
| (32) | W→A | Transfer contents of Work Register 14 to Accumulator Register 26. |
| (33) | A→W | Transfer contents of Accumulator Register 26 to Work Register 14. |
| (34) | W→L | Transfer contents of Work Register 14 to Log Register 28. |
| (35) | L→W | Transfer contents of Log Register 28 to Work Register 14. |
| (36) | A→$S_1$ | Transfer contents of Accumulator Register 26 to Storage I 34. |
| (37) | $S_1$→A | Transfer contents of Storage I 34 to Accumulator Register 26. |
| (40) | W→$S_2$ | Transfer contents of Work Register 14 to Storage II 36. |
| (41) | $S_2$→W | Transfer contents of Storage II 36 to Work Register 14. |
| (42) | $P_0$ | Begin program (under Card Reader control). |
| (43) | PDS | Store contents of Decrement Counter 32 in Decrement Counter Store 54 and contents of Program Counter 30 in Program Counter Store 56 and transfer contents of first two stages in Work Register 14 to Program Counter 30. |
| (44) | PDR | Recall the values in Program Counter Store 56 and Decrement Counter Store 54. |
| (45) | DEC | Step Decrement Counter 32 by one unit. |
| (46) | Test DC | Test DC for zero. |
| (47) | Test A | Test Accumulator Register 26 for zero. |
| (50) | Test W | Test Work Register 14 for zero. |
| (51) | Test L | Test Log Register 28 for sign. |

Figures 2, 3:
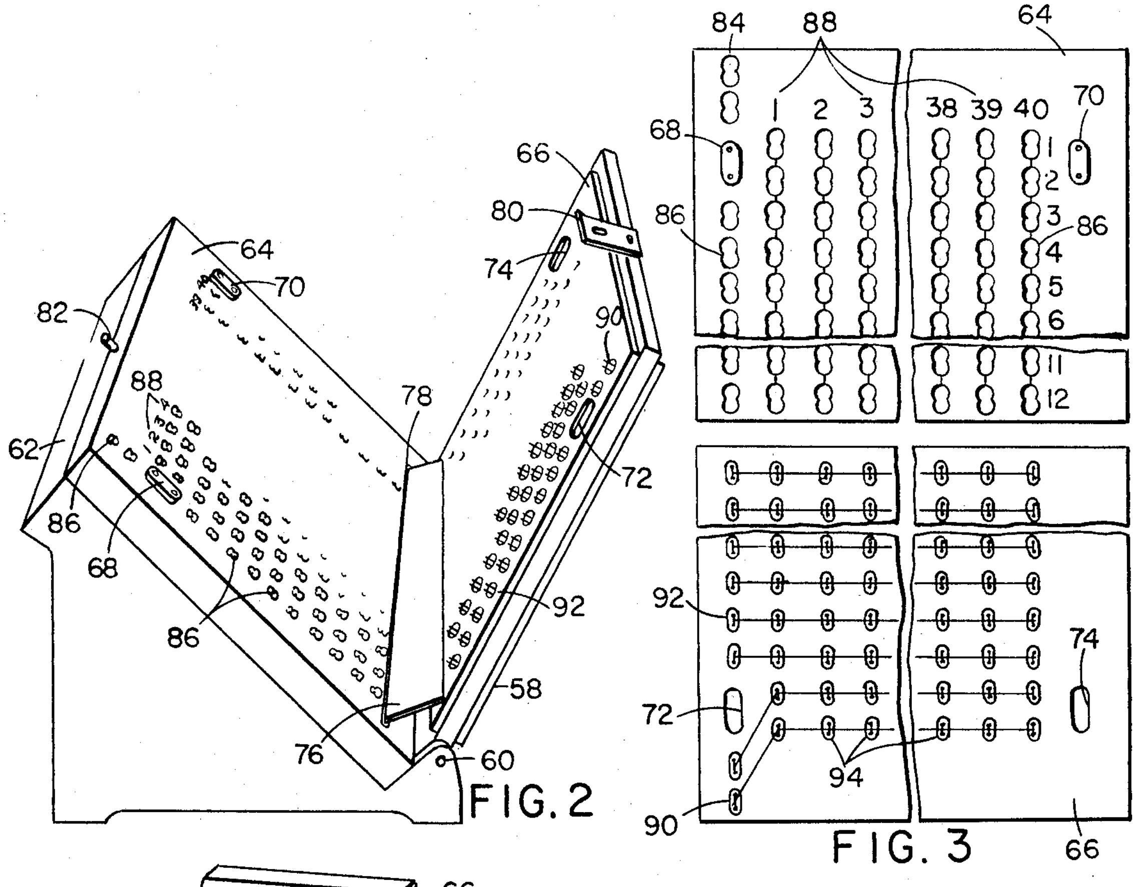
FIG. 2 is a perspective view of the card reader, in open position.
FIG. 3 is a schematic diagram of the contacts in the cover and base of the card reader.

Card Reader 42 is shown in more detail in the open position in FIG. 2. A cover 58 is attached by hinges 60 to base 62. Card Reader 42 is designed to receive card 46 between face 64 of the base and face 66 of the cover. The card will be aligned laterally by vertical front guide 68 and vertical rear guide 70 which are received by front recess 72 and rear recess 74 in cover 58 permitting faces 64 and 66 to meet flush with the card between them. The card is held vertically in position by means of stop 76 which also acts as a limiting device on the movement of cover 58; stop 76 moves into slot 78 in base 62 as the cover is closed causing no impediment to the previously mentioned flush relation of faces 64 and 66. Latch 80 and pin 82 serve to secure the cover in the closed position.

Face 64 contains a column 84 of twelve kidney shaped flat contacts 86 outside the card sensing area. In the card sensing area there is a matrix 88 of forty columns of contacts each containing twelve kidney shaped flat contacts 86 arranged on face 64 to correspond to positions to be read on Card 46, as can be seen more readily in FIG. 3. Housed within base 62 is a diode decoding matrix which decodes the signals applied to contacts 86 and applies the decoded signals to cable 44.

Face 66 contains a column 90 of twelve pairs of prong contact elements 92. Column 90 is disposed so that each of its pairs of prongs 92 will contact and complete an electrical circuit with a corresponding kidney shaped contact 86 in row 84 when cover 58 is closed. A matrix 94 of forty columns, each containing twelve pairs of prong contact elements 92, are arranged on the remainder of face 66 to correspond to positions to be read on a card. The contacts in matrix 94 are disposed so that each one of the pairs of prongs 92 will contact a corresponding kidney shaped contact 86 in group 88 when cover 58 is closed, unless the corresponding data position on an interposed card has not been punched.

The forty pairs of prongs 92 in each of the twelve separate rows in matrix 94 are connected in series and are connected to a corresponding one of the twelve prongs in column 90. The kidney shaped contacts 86 in each of the eighty separate columns in matrix 88 are connected together in groups of six to an input line in cable 44 and are not connected directly to any of the contacts in column 84. The contacts in column 84 are divided in two identical groups of six and are connected to six corresponding output lines in cable 44.

When any particular group of sensors (a column of six) of a card in the Card Reader 42 is desired to be read, that column of six contacts in matrix 88 will be energized. Any positions in that column which coincide with a punched position in the corresponding column on the card will be in contact with a pair of prongs at the corresponding row and column position of matrix 94. Since all forty pairs of prongs in each row of group 94 are in series, a signal appearing at any position in a row will pass through that row to a corresponding pair of prongs in column 90 and from there via the corresponding contact 86 in column 84 to the corresponding output line.

Figure 4:
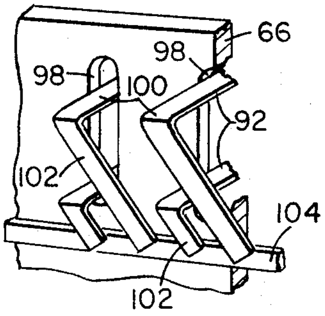
FIG. 4 is an enlarged view of the contacts in the cover.

A more detailed showing of a pair of prongs is shown in FIG. 4. Each pair of prongs 92 protrudes from cover 40 through an aperture 98 in face 66. Each prong 100 is formed integrally with a strap 102 of spring like material which acts to bias its respective prong 100 outwardly through aperture 98. Strap 102 is fastened to bus bar 104 which serves as a mounting for and electrically connects the prongs in each row.

A block diagram of a calculator system embodying the present invention is shown in FIG. 6. Accumulator 26 is a ten digit position shift register for operation in a binary coded decimal radix, thus each "position" is actually four bits. The most significant digit position is at the left and the least significant digit position is at the right of Accumulator Register 26. Work Register 14, Log Register 28 and Storage Registers 34 and 36 are of the same type as Accumulator Register 26; the entire arithmetic portion of the system operates in the binary coded decimal radix. Accumulator 26 may accumulate the sum of, or the difference between, a value which it contains and one supplied from Storage 34 via Gate 106 or from Work Register 14 via Gate 108. Adder-Subtracter 110, conditioned to add or subtract by Add-Subtract Control 112, receives the output digit of the least significant stage of Accumulator 26 at one of its inputs and receives at its other input a second digit from whichever of Gates 106 or 108 is enabled and presents the result digit to the input (most significant) stage of the Accumulator; Gate 106 is enabled by a signal at $P_{106}$ and Gate 108 by a signal at $P_{108}$. Add-Subtract Control 112 will condition Adder-Subtracter 110 to add if a signal is received at $P_{AA}$ or subtract if a signal is received at $P_{AS}$. Accumulator 26 may be shifted by the application of a pulse at $P_{26}$. The digits in Storage 34 may be shifted by application of a pulse at $P_{34}$ and information entered into it through Gate 114 by applying an enabling signal at $P_{114}$.

Information represented by Numeral Keys 18 is entered in Work Register 14 by Addressor 116. Similar numerical data received from Card Reader 42 is presented to Addressor 116 at $P_{116}$. Each time a Numeral Key 18 is depressed a binary one is stepped through Decimal Register 22 until Decimal Point Key 20 is depressed. At that time the stepping of Decimal Register 22 ceases and the position of the decimal point in the entered number is recorded.

Work Register 14 provides signals to Accumulator 26 via Gate 108, to Storage 36 via Gate 118, to Decrement Counter 32 via Gate 120, to a Program Counter 30 via Gate 122 and provides two inputs to its associated Adder-Subtractor 124. One of the inputs is connected directly to Adder-Subtracter 124 while the second input, originating at the same output of Work Register 14, may be directed through none, one or more of the Delays 126, 128, 130, and 132 depending upon which one of Gates 134, 136, 138, 140 or 142, is enabled by a signal at $P_{134}$, $P_{136}$, $P_{138}$, $P_{140}$ or $P_{142}$, respectively. The second input to Adder-Subtracter 124 may also receive a signal from Decrement Counter 32 via Gate 144 enabled by a signal at $P_{144}$, from Accumulator 26 via Gate 146 enabled by a signal at $P_{146}$, from Log Register 28 via Gate 148 enabled by a signal at $P_{148}$, or from Storage 36 via Gate 150 enabled by a signal at $P_{150}$. Work Register 14 receives information from Adder-Subtracter 124 and is shifted by a signal at $P_{14}$. The four Delays 126, 128, 130 and 132 provide a means for presenting the value stored in Work Register 14 to Adder-Subtracter 124 shifted by one, two, three or four positions depending upon which gate is enabled. Any number of delays may be used dependent upon the capabilities desired for a particular machine.

Add-Subtract Control 152 will condition Adder-Subtracter 124 to add if a signal is received at $P_{WA}$ or to subtract if a signal is received at $P_{WS}$. AND circuit 154 monitors a number of stages, other than the Most Significant Digit Stage (MSD) 156, of Work Register 14 in accordance with the accuracy desired in the calculations and will respond to an all-zero input when Add-Subtract Control 152 directs subtraction and to an all-nines input when it directs addition. The output of AND circuit 154 is applied to the Control 52 of the calculator via line *i*.

Add-Subtract Control 152 also applies a signal to Gate 158 along with one from MSD 156. Both signals will be presented to the Most Significant Digit Sensor (MSD Sensor) 160 when Gate 158 is enabled by a signal on line *j* from Control 52 which is present when the logarithm of a number in Work Register 14 is being accumulated directing addition MSD Sensor 160 will be conditioned to seek a one in MSD 156, while a subtract direction will condition MSD Sensor 160 to seek a zero in MSD 156.

The accumulation of the logarithm of a number in Work Register 14 is accomplished in Log Register 28 through Adder-Subtracter 162. Log Register 28 is shifted by a signal at $P_{28}$ and provides outputs to Work Register 14 via Gate 148, to one input of associated Adder-Subtracter 162 and to second input of Adder-Subtracter 162 via Gate 164 enabled by a signal at $P_{164}$. A second input to Adder-Subtracter 162 is provided by Log Store 166 via Gate 168 enabled by a signal at $P_{168}$. Log Modifier 170 may be caused to operate on a logarithm from Log Store 166 en route to Gate 168. For example, it may double the logarithm when the □ (square) Key 24 has been depressed, or halve the logarithm when the √‾ (square root) Key 24 has been depressed, upon the proper instruction from Control 52 over line *g*. Log Store 166 contains the logarithms to be used by the calculator, which may be read out by providing a signal at the appropriate one of lines $P_1$, $P_2$, $P_3$, $P_4$, $P_5$ and $P_6$. The specific embodiment here uses only six logarithm values, as will be discussed infra, but it is apparent that should greater accuracy be desired additional ones may be employed.

Log Store 166 stores the logarithmic values of preestablished constants which are related to the radix of the number system to be employed in the calculator and may be related to any desired base, for example the base 10. In this calculator the base $e$ is employed and the constants are as follows:

TABLE IV.—LOGARITHMS AND CONSTANTS EMPLOY

| | Constant | Log |
|---|---|---|
| Mode: | | |
| 1 | 10 | 2.302585093 |
| 2 | 2 | .693147181 |
| 3 | .9 | .105360516 |
| 4 | 1.01 | .009950331 |
| 5 | .999 | .001000500 |
| 6 | 1.0001 | .000099995 |

It will be noted that the last four constants are in the form $1+1/R^{A}$ where R is the radix and A is, successively, the integers 1, 2, 3, and 4. Each logarithm read out of Log Store 166, as directed by Control 52, is applied to Adder-Subtractor 168 to modify the contents of register 28 in an addition or subtraction operation, also as controlled by Control 52. Control 52 also causes the contents of Work Register 14 to be modified in multiplication and division operations by the constants. These modification operations, while coordinated, may be performed in various manners, for example at substantially the same time or one modification operation may be completed and the other then commenced and performed as a function of the first.

Add-Subtract Control 172 will condition Adder-Subtracter 162 to add if a signal is received at a $P_{LA}$ or to subtract if a signal is received at $P_{LS}$. AND circuit 174 monitors a number of stages, other than the Most Significant Digit Stage (MSD) 176, of Log Register 28 in accordance with the accuracy desired in the calculations and will respond to an all-zero input when Add-Subtract Control 172 directs subtraction and to an all-nines input when it directs addition. The output of AND circuit 174 is applied to Control 52 via line $f$.

Add-Subtract Control 172 also applies a signal to Gate 178 along with one from MSD 176. Both signals will be presented to MSD Sensor 160 when Gate 178 is enabled by a signal on line $e$ from Control 52 which is present when antilogarithm of a logarithm in Log Register 28 is being accumulated in Work Register 14. With Add-Subtract Control 172 directing addition MSD Sensor 160 will be conditioned to seek a one in MSD 176 while a subtract direction will condition MSD Sensor 160 to seek a zero in MSD 176.

At certain predetermined times, such as the division by ten operation effected in the first mode of the generation of a log of a number, Control 52 provides a signal at $P_{22}$ which causes an interrogation of the most significant position of Decimal Register 22 for the presence or absence of the decimal point which information is then communicated to Control 52. If an antilogarithm is to be assembled by the machine a signal from Control 52 will remove any decimal point in Decimal Register 22. Through Delay 180 the same signal will cause the Characteristic Transfer Gate 182 to transfer the characteristic which is in MSD stage 176 to Decimal Register 22. Decimal Register 22 is a binary coded decimal register as is Log Register 28 thus allowing for direct transfer between the two.

Program Counter 30 may receive an input from Work Register 14 via Gate 122 or from Program Counter Store 56 via Gate 184 enabled by a signal at $P_{184}$. Program Counter 30 is shifted by a signal at $P_{30}$ and stepped by a signal at $P_p$; Program Counter Store 56 is shifted by a signal at $P_{56}$. The PDS command, code (43), shown in Table III transfers the contents of Decrement Counter 32 to Decrement Counter Store 54, and transfers the contents of Program Counter 30 to Program Counter Store 56 while also transferring the numbers in the two most significant positions in Work Register 14 to Program Counter 30. The values thus removed may be replaced in Program Counter 30 and Decrement Counter 32 by employing the PDR command, code (44).

Decrement Counter 32 may receive an output from Work Register 14 via Gate 120 or from Decrement Counter Store 54 which appears through Gate 190 enabled by $P_{190}$. Values in Decrement Counter 32 may be decremented by a signal at $P_D$ and shifted at $P_{32}$. A signal destined for Decrement Counter Store 54 must pass through Gate 192 enabled by $P_{192}$; data is shifted through Decrement Counter Store 54 by signals applied at $P_{54}$.

Decrement Counter 32 is used to count the number of times an iterative operation has been performed. If, for example, a particular operation is to be carried out M times, the number M may be loaded in Decrement Counter 32 and decreased by one each time the operation is performed continuing the backward counting until zero remains. After each iteration "0" Sensor 194 is tested to see if the count has been reduced to zero; if a zero is not found the system is directed to begin again at the initial step of the operation.

Associated with Control 52 is Clock Pulse Source 198 which provides the signals to Distributor Circuits 196 which Control 52 directs throughout the system as enabling and shifting signals. Additional information as to the nature and operation of this calculator apparatus may be had with reference to U.S. Pat. 3,428,950.

The calculator of the invention performs a variety of mathematical manipulations. Simple addition and subtraction operations are accomplished by accumulating the sum or difference in Accumulator 26. Other manipulations are accomplished by operating with the logarithms of the numbers involved. Since the logarithms of only a group of preselected constants, e.g., Table IV, are stored in the system, the logarithm of each number involved is generated prior to performance of operations such as multiplication or division. The apparatus for generating logarithms will be more readily understood by reference to Table V which describes in tabular form the generation of a logarithm.

TABLE V.—OPERATION TO GENERATE A LOGARITHM (1) A number is entered in Work Register (WR) 14 under the control of the Numeral Keys 18 or the Card Reader (CR) 42.

(2) The multiply instruction is conducted to Control 52 via line $k$ either by depressing the Multiply (X) Key 24 or through CR 42. This initiates the series of manipulations indicated in Table IV.

(3) Mode 1 (Table IV) senses the position of the decimal point and begins by Control 52 presenting an interrogating signal to Decimal Register (DR) 22 at $P_R$. A signal will appear on line $a$ if the decimal point is not present in the most significant position of DR 22 and on line $b$ if it is.

(4) A signal appearing on line $a$ causes Control 52 to present a basic cycle of signals to the system (generated by Clock Pulse Source 198 and distributed by Distribution Circuits 196). A signal is routed to $P_{22}$ shifting the decimal point one position toward the most significant stage of DR 22, thereby effectively dividing the value in WR 14 by a value of ten, to $P_{LA}$ placing Add-Subtract Control (ASC) 172 and AND circuit 154 in the addition state, and to $P_{163}$ enabling Gate 168. A series of ten signals are routed to $P_1$ and $P_{28}$ combining, negatively, the log of 10 in Log Store (LS) 166 with the value (initially zero) in Log Register (LR) 28 through Adder-Subtractor (AS) 162 and accumulating their sum in LR 28. A pulse will now cause Control 52 to interrogate DR 22 as to the position of the decimal point. If it is not present in the most significant position a signal will appear on line $a$ and cause the foregoing operation to be repeated until the decimal point is at the most significant position (the number in WR 14 has an effective value of less than one).

(5) When the decimal point is present at the most significant position a signal will appear on line $b$ initiating operation in mode 2, Table IV. Control 52 now presents a signal at $P_{WA}$ setting ASC 152 to the addition state and ASC 172 receives a signal at $P_{LS}$ setting it to the subtraction state. A signal will now appear on line *c* if the value in MSD 156 is a one or on line *d* if the value is a zero.

(6) A signal appearing on line *d* causes Control 52 to present a basic cycle of signals to the system. Signals are applied to $P_{14}$ and $P_{142}$ causing each digit in WR 14 to be applied to both inputs of AS 174 thus adding the value in WR 14 to itself; in a doubling operation $P_2$, $P_{28}$, $P_{164}$ and $P_{168}$ also receive signals causing each digit in LR 28 to have subtracted from it the corresponding digit of the log of 2 through operation of AS 162. Thus, the log of two is subtracted from the value in LR 28. The condition of lines *c* and *d* will now be checked. If the value in MSD 156 is still zero a signal on line *d* will cause Control 52 to repeat the operation. If a one is found a signal will appear on line *c* initiating mode 3, Table IV.

(7) A signal on line *c* causes a signal at $P_{LA}$ setting ASC 172 to the addition state and a signal at $P_{WS}$ setting ASC 152 to the subtraction state. Since a one is present in MSD 156 a signal will appear on line *d* causing a series of ten signals to be presented at $P_{14}$ and $P_{140}$, thus subtracting from the number in WR 14 a once shifted value of that number and effectively multiplying it by nine-tenths. Simultaneously, signals are applied at $P_{28}$, $P_{164}$, $P_{168}$ and $P_3$ shifting the log of 0.9 out of LS 166 and adding it to the value in LR 28. The condition of lines *c* and *d* are next checked and if the value in MSD 156 is still not zero a signal on line *d* causes the operation to be repeated. If it is zero, a signal will appear on line *c* initiating mode 4, Table IV.

(8) A signal on line *c* now causes $P_{WA}$ and $P_{LS}$ to receive signals conditioning ASCs 152 and 172 to the addition state and subtraction state, respectively. A zero being present in MSD 156, a signal will appear on line *d* causing signals to be applied at $P_{14}$ and $P_{138}$, thus adding the number in WR 14 to a twice shifted value of itself and effectively multiplying that number by 1.01. $P_{28}$, $P_{164}$, $P_{168}$ and $P_4$ are simultaneously provided with signals thereby subtracting the log of 1.01 from the value in LR 28. Lines *c* and *d* are next checked and if a zero is still present in MSD 156 a signal on line *d* causes the operation to be repeated. If a one is now present, a signal on line *c* initiates mode 5, Table IV.

(9) A signal on line *c* now causes $P_{LA}$ and $P_{WS}$ to receive signals conditioning ASCs 172 and 152 to the subtraction state and addition state, respectively. A one being present in MSD 156, a signal will appear on line *d* causing signals to be applied at $P_{14}$ and $P_{136}$, thus subtracting from the number in WR 14 a thrice shifted value of that number and effectively multiplying it by 0.999. Simultaneously, signals are applied at $P_{28}$, $P_{164}$ $P_{168}$ and $P_5$ shifting the log of 0.999 out of LS 166 and adding it to the value in LR 28. Lines *c* and *d* are checked and if the value in MSD 156 is still not zero a signal on line *d* causes the operation to be repeated. If it is a zero, a signal will appear on line *c* initiating mode 6, Table IV.

(10) A signal on line *c* now causes $P_{LS}$ and $P_{WA}$ to receive signals conditioning ASCs 172 and 152 to the addition state and subtraction state, respectively. A zero being present in MSD 156, a signal will appear on line *d* causing signals to be applied at $P_{14}$ and $P_{134}$, thus adding the number in WR 14 to a four times shfited value of itself and effectively multiplying it by 1.0001. Simultaneously, signals are applied at $P_{28}$, $P_{164}$, $P_{168}$ and $P_6$ shifting the log of 1.0001 out of LS 166 and subtracting it from the value in LR 28. Lines *c* and *d* are next checked and if the value in MSD 156 is still not one, a signal on line *d* causes the operation to be repeated. If it is a one, a signal will appear on line *c* thus ending the operation and, if the system is under control of CR42, presenting a signal at $P_p$ to step Program Counter 30.

An example of this operation applied to a particular number is indicated in Table VI where the steps using the six modes of Table IV to generate the log to the base *e* of the number 2.10 by this apparatus are set forth.

TABLE VI.—GENERATING THE LOG OF 2.1

| | Constant applied | Register 14 | Register 28 |
|---|---|---|---|
| Mode: | | | |
| | | 2.100000 | 0.00000 |
| 1 | 10 | .210000 | 2.30259 |
| 2 | 2.0 | .420000 | 1.60944 |
| 2 | 2.0 | .840000 | .91629 |
| 2 | 2.0 | 1.680000 | .22314 |
| 3 | 0.9 | 1.512000 | .32850 |
| 3 | 0.9 | 1.360800 | .43389 |
| 3 | 0.9 | 1.224720 | .53922 |
| 3 | 0.9 | 1.102248 | .64458 |
| 3 | 0.9 | .992024 | .74994 |
| 4 | 1.01 | 1.001944 | .73999 |
| 5 | 0.999 | 1.000943 | .74099 |
| 5 | 0.999 | .999943 | .74199 |
| 6 | 1.0001 | 1.000042 | .74189 |

If multiplication is to be performed, the multiplier is loaded into Work Register 14 and the logarithm of this quantity is generated in the same manner as described above, thus that quantity is added to the log value already stored in the Log Register 28. If division is to be performed, the steps of generating the logarithm of the second number are performed in complement sequence so that that quantity is effectively subtracted from the value stored in the Log Register 26.

When it is desired to obtain the natural number from a logarithm (antilog), the steps are reversed with the Work Register 14 being set initially to the value 1.0, Log Register 28 containing the logarithm of the value to be set into Work Register 14. A signal from Control 52 will clear Decimal Register 22, and that signal, applied through Delay 180, will cause Characteristic Transfer Gate 182 to transfer to Decimal Register 22 the position of the decimal point as represented by the value of the characteristic of the logarithm in Log Register 28. Subsequent steps are now performed in the same manner as set forth above for generating the log.

A simple program to calculate the value $6^2+4\times2$ would be set up as in Table VII.

TABLE VII.—EXAMPLE PROGRAM

| Step | Code | Command | Remarks |
|---|---|---|---|
| 00 | (22) | 6 | Load 6 in WR14. |
| 01 | (04) | □ | Logarithm of 6 is generated, doubled, and the antilog is taken and placed in WR14. |
| 02 | (32) | W ⟶ A | Transfer value in WR14 to AR26. |
| 03 | (20) | 4 | Load 4 in WR14. |
| 04 | (07) | + | Add value in WR14 to value in AR26. |
| 05 | (33) | A ⟶ W | Transfer value in AR26 to WR14. |
| 06 | (06) | X | Generate log of value in WR14 accumulating it in LR28. |
| 07 | (16) | 2 | Load 2 in WR14. |
| 08 | (06) | X | Generate log of value in WR14 accumulating it in LR28. |
| 09 | (10) | $LN^{-1}$ | Take antilog of value in LR28. |
| 10 | (26) | STOP | Cease operations. |

While the apparatus has been described largely in conjunction with the decimal radix, it will be obvious that the invention is not limited thereto and provides calculating mechanisms which may operate in any desired radix to perform multiplication, division, and other complex mathematical calculations through the use of logarithms, which also may be to any desired base. The storage capacity required for the calculator is small, as only selected logarithmic values need to stored. The simplicity of the logic enables the calculator to be a compact device suitable for desk type use and enables accurate calculations to be performed with facility heretofore impossible except with much larger and more complex devices.

While a preferred embodiment of the invention has been shown and described, various modifications thereof will be apparent to those having ordinary skill in the art, and therefore it is not intended that the invention be limited to the described embodiment or to details thereof and departures may be made therefrom within the spirit and scope of the invention as defined in the claims.

What is claimed is:

1. An electronic calculator system comprising in combination:

a keyboard unit having a plurality of manually actuable control elements including ten control elements for producing codes representing numerical values from 0 through 9 and other control elements for producing instruction codes, input display register means for accumulating and visually displaying said numerical values, an arithmetic unit coupled to said input display register means for manipulating the numerical value in said input display register means in response to instruction codes, a record sensing device for receiving a record in fixed relation to said device and having addressable groups of data item sensors each said groups positioned to sense the data code at a set of predetermined record data locations, means responsive to the sensing of data codes representing numerical values to accumulate said values in said input display register means, means responsive to the sensing of other data codes representing instruction codes to control the operation of said arithmetic unit and of said record sensing device, and a program counter for sequentially addressing successive ones of said groups of data item sensors.

2. The electronic calculator system of claim 1 wherein:

said record sensing device comprises a matrix of data item sensors disposed on said device in locations corresponding to predetermined record data locations, said data item sensors being arranged in a series of groups, a plurality of sensor group actuators, and a plurality of output lines, each sensor group having a unique group actuator coupled to it and the corresponding sensors in said groups being coupled to a corresponding output line, and means to sequentially operate addressed sensor group actuators to provide on said output lines signals representative of the data encoded on a record disposed on said device.

3. The electronic calculator system as claimed in claim 1 wherein data is stored on said record in the form of apertures at selected ones of said predetermined locations and each said data item sensor includes a first circuit element carried by said record sensing device for location on one side of a record positioned on said device and a second circuit element carried by said device for location on the opposite side of said record so that a circuit is completed between said elements of a data item sensor only when said record has an aperture at the location corresponding to that data item sensor.

4. The electronic calculator system as claimed in claim 3 wherein each of said first circuit elements is a contact, the surface of which is flush with a record receiving surface of said device, and each of said second circuit elements is a resilient contact member adapted to engage a corresponding one of said first contact members to complete a circuit therebetween.

5. The electronic calculator system as claimed in claim 4 wherein each said first circuit element is a flat elongated contact, and each said second circuit element includes a pair of contacts spring-biased to bear on the corresponding one of said first circuit elements.

6. The electronic calculator system as claimed in claim 3 wherein said first circuit elements are disposed in a first matrix of columns and rows corresponding to said predetermined record data locations, said second circuit elements are disposed in a second matrix of columns and rows also corresponding to said predetermined record data locations, all circuit elements in each column of one of said matrices are connected in series, and all circuit elements in each row of the other of said matrices are connected in series.

7. The electronic calculator system as claimed in claim 6 wherein said first matrix is mounted upon one component of said record sensing device, said second matrix is mounted upon another opposed component of said record sensing device, the series connected circuit elements of one of said matrices are coupled to sensor group actuators at one of said components, and the series connected circuit elements of the other of said matrices are coupled to output lines at the same component via means comprising a set of contacts upon one of said components and a cooperating set of contacts upon the other of said components said set of contacts and said cooperating set of contacts being located outside said matrices.

8. The electronic calculator system as claimed in claim 3 wherein said first circuit elements are disposed on a face of a base component of said record sensing device, and said second circuit elements are disposed on a face of an opposed cover component of said record sensing device adapted to be positioned in juxtaposition to said base face, and comprising record positioning means projecting from said base component for properly positioning a record relative to said data item sensors and means in said cover component for receiving said record positioning means to permit said base and cover components to be disposed parallel and in close proximity to one another when said record receiving device is in closed position.

9. The electronic calculator system as claimed in claim 8 wherein said record positioning means includes vertical record margin guides, and further including record support and alignment means extending generally perpendicular to said margin guides and movable with said cover component to provide horizontal support of said record in proper alignment with said data item sensors as said cover component is moved to closed position.

10. The electronic calculator system as claimed in claim 1 further comprising means responsive to one of said other control elements to cause activation of said record sensing device, and means responsive to the sensing of one of said instruction codes to cause deactivation of said record sensing device.

References Cited

UNITED STATES PATENTS

| | | | |
|---|---|---|---|
| 2,878,872 | 3/1959 | Burns et al. | 235—61.113 |
| 2,971,693 | 2/1961 | Dobberstein et al. | 235—61.113 |
| 3,000,555 | 9/1961 | Innes | 235—61.6 |
| 3,017,082 | 1/1962 | Riddiford et al. | 235—61.111 |
| 3,158,419 | 11/1964 | Meyer et al. | 235—61.111 |
| 3,197,618 | 7/1965 | Stanley et al. | 235—61.6 |
| 3,335,407 | 8/1967 | Lange et al. | 235—61.6 |
| 3,402,215 | 9/1968 | Wang | 235—160 |

DARYL W. COOK, Primary Examiner

U.S. Cl. X.R.

235—61.11

PO-1050
(5/69)

UNITED STATES PATENT OFFICE
CERTIFICATE OF CORRECTION

Patent No. 3,511,974 Dated May 12, 1970

Inventor(s) An Wang

It is certified that error appears in the above-identified patent and that said Letters Patent are hereby corrected as shown below:

Column 1, line 43 "a" should be --the--.
Column 3, lines 28-29, Table I.,"A⟶W----" and W⟶A----" should be omitted.
Column 6, line 46, after "accumulated" add --in Log Register 28. With Add-Subtract Control 152--.
Column 7, line 3 "EMPLOY" should be --EMPLOYED--;
line 13 "$1+1/R^A$" should be --$1\pm1/R^A$--;
line 16, "Subtractor" should be --Subtracter--.
Column 8, line 3, after "shifted" insert --by a signal--.
Column 9, line 72 "CR42" should be --CR 42--.
Column 10, line 63 "to" should be --be--.
Column 12, line 60 "3,402,215"should be --3,402,285--.

SIGNED AND SEALED
SEP 15 1970

(SEAL)
Attest:

Edward M. Fletcher, Jr.
Attesting Officer

WILLIAM E. SCHUYLER, JR.
Commissioner of Patents